United States Patent [19]

Tustison et al.

[11] Patent Number: 4,907,846
[45] Date of Patent: Mar. 13, 1990

[54] THICK, IMPACT RESISTANT ANTIREFLECTION COATINGS FOR IR TRANSPARENT OPTICAL ELEMENTS

[75] Inventors: Randal W. Tustison, Lexington; Dennis G. Montanari, Townsend, both of Mass.

[73] Assignee: Raytheon Company, Lexington, Mass.

[21] Appl. No.: 123,491

[22] Filed: Nov. 20, 1987

[51] Int. Cl.$^4$ .......................... G02B 1/10; G02B 5/28; G32B 18/00; G32B 33/00

[52] U.S. Cl. .................................... 350/1.6; 350/164; 428/908.8

[58] Field of Search ........................ 350/1.6, 1.1, 164; 428/908.8

[56] References Cited

U.S. PATENT DOCUMENTS

| | | | |
|---|---|---|---|
| 2,758,510 | 8/1956 | Auwärter | 350/1.6 X |
| 3,432,225 | 3/1969 | Rock | 350/164 |
| 4,461,750 | 7/1984 | Chess et al. | |
| 4,476,156 | 10/1984 | Brinker et al. | |
| 4,498,728 | 2/1985 | Thöni et al. | 350/1.7 |

FOREIGN PATENT DOCUMENTS

| | | | |
|---|---|---|---|
| 0049032 | 4/1982 | European Pat. Off. | |
| 292125 | 10/1953 | Switzerland | 350/164 |
| 2105371 | 3/1983 | United Kingdom | |
| 2165266 | 4/1986 | United Kingdom | |

OTHER PUBLICATIONS

Hodgson et al, "Diamond Turning of IR Components," *SPIE Infrared Technology and Applications*, vol. 590 (1985), pp. 71-76.
Field et al, "Liquid Impact Damage Assessment for a Range of Infra-Red Materials," Appendix, *Proceedings 6th International Conference on Erosion by Liquid and Solid Impact*, Sep. 1983, pp. 21-1 to 21-3.
Zwaag et al, "The Effect of Double Layer Coatings of High Modulus on Contact Stresses," *Philosophical Magazine A*, Jan. 1986, vol. 53, No. 1, pp. 101-111.
"Oxide Films for Optical Applications," Table III, *Applied Optics*, vol. 18, No. 12, 15 Jun. 1979, pp. 1972-1973.
Bar and Stroud Specification Sheet No. AR25, "Advance Technical Data: Abrasion Proof. High Temperature Operation" (date unknown).
Lussier, F., "Guide to IR-Transmissive Materials," *Laser Focus*, vol. 12, No. 12, Dec. 1976, pp. 47-50.
Compressive Thin Films for Increased Fracture Toughness, P. H. Kobrin & A. B. Harker, Rockwell International Science Center, pp. 5-9.
"Impact Damage Thresholds in Brittle Materials Impacted by Water Drops", A. G. Evans, V. M. Ito & M. Rosenblatt, 1980 American Institute of Physics, J. Appl. Phys., 51(5), May 1980.
"Liquid Jet Impact Damage on Zinc Sulfide", S. Van Der Zwag, J. E. Field, Dept. of Metallurgy, Journal of Material Science, 17 (1982), pp. 2525-2636.
"Growth of Diamond at Room Temperature by an Ion-Beam Sputter Deposition Under Hydrogen-ion Bombardment", Makoto Kitabatake & Kiyotaka Wasa Central Research Labaratroois, J. Appl. Phys, 58(4), 15 Aug. 1985.
S. Van der Zwaag and F. E. Field AFWAL-TR-8-2-4022.
J. E. Field, S. VanDer Zwagg, D. Townsend and J. P. Dear, AFWAL-TR-83-4101.

*Primary Examiner*—Bruce Y. Arnold
*Assistant Examiner*—David J. Edmondson
*Attorney, Agent, or Firm*—Maloneyi Denis G.; Richard M. Sharkansky

[57] ABSTRACT

An impact resistant antireflection coating for an optical element which mitigates damage to the optical element when an air flight system having the optical element is flown through a high velocity droplet impact medium is described. The coating comprises a material having a relatively high modulus of elasticity compared to the modulus of elasticity of the material of the optical element. The coating is deposited to a half wavelength thickness at a wavelength which must be maximally transmitted through the optical element. A quarter wavelength antireflection coating layer at the wavelength which must be maximally transmitted through the optical element is then disposed over the impact protection coating layer. The material of the antireflection coating is preferably of a high modulus of elasticity material having a refractive index which is intermediate the refractive index of the material of the base layer and the medium through which the airborne system is flown.

16 Claims, 2 Drawing Sheets

THICK, IMPACT RESISTANT ANTIREFLECTION COATINGS FOR IR TRANSPARENT OPTICAL ELEMENTS

BACKGROUND OF THE INVENTION

This invention relates generally to optical elements and more particularly to impact protection and antireflection coating of optical elements.

As is known in the art, optical imaging systems generally include one or more externally mounted optical elements which shield the remainder of the imaging system from an external environment. For example, with infrared (IR) airborne imaging systems, an IR transparent optical element such as a window or dome is generally mounted on the airborne system to isolate the remainder of the IR imaging system from exposure to humidity, corrosive, and abrasive environments. Prolonged exposure to these environments generally degrades the optical and physical characteristics of the material of the external optical element. Generally, however, the most severe environmental exposure encountered by such external optical elements appear to be high velocity water droplet impact which occurs when an airborne system is flown through a rain field.

This problem of water droplet impact is more generally referred to in the art as rain erosion. During flight through a rain field, water droplets from a rain field impinge upon the surface of the external element producing subsurface fractures even at subsonic velocities. For very brittle materials, these subsurface fractures are initiated at pre-existing microflaws lying near or at the surface of the optical element. Rain erosion damage to such optical elements occurs prior to any significant removal of material. The mere propagation of these pre-existing microflaws is sufficient to damage the optical element. In particular, these microflaws are propagated through the optical element by the tensile component of a surface stress wave created at the time of impact with the water droplet. Once formed, the continued propagation of a subsurface fracture through the optical element will often produce large cracks in the optical element. In the region of the cracks scattering and refraction of incident IR energy occurs producing increased internal reflections and IR energy losses. With a significant number of such cracks, the transmissivity of the optical element is severely reduced. Furthermore, as cracks propagate through the optical element, catastrophic failure of the element may occur. When the optical element shatters or breaks, the remaining optical elements of IR imaging system are exposed to the external environment resulting in potential catastrophic damage to the imaging system.

Typically, materials which offer the best mechanical durability and optical performance for infrared imaging systems, such as long wavelength infrared energy (LWIR) particularly in the 8.0 micron to 12.0 micron infrared band are limited to a relatively small number. Suitable materials include zinc sulfide, zinc selenide, germanium, gallium arsenide, gallium phosphide, mercury cadmium telluride, and cadmium telluride. Ternary sulfides having the formula $MLn_2S_4$, where M is a group 1 cation, Ln is a lanthanide rare earth series cation and S is the $S^{-2}$ sulfide anion, such as calcium lanthanum sulfide are also currently being developed for IR applications particularly in the 8 to 12 micrometer band. These ternary sulfide materials may provide some improvements in durability but even these materials are susceptible to the environmental exposures mentioned above. Generally, al of the aforementioned materials are relatively brittle and have a relatively low resistance to damage, particularly damage sustained during high velocity water droplet impact.

It is also known in the art that optical energy incident upon a surface of an optical element will result in reflection of such energy at such surface if the index refraction of the material comprising the optical element is significantly different than the index of refraction of the medium from which the energy originates. Generally, for airborne systems, the originating medium is air having an index of refraction of about 1. Accordingly, it is standard practice in the optical industry to provide coatings of materials of appropriate refractive index over the incidence surface of the optical element to reduce such reflection losses. At the deposited thicknesses which are generally related to a fraction of an optical wavelength, these coatings are transparent in the IR band. However, heretofore, such optical coatings have served only to reduce reflection losses caused by a mismatch in refractive indices and have not served to increase the impact resistance of the optical element in any significant manner.

It is also known in the art that a layer of hard carbon, that is a carbon layer having quasi-diamond bonds and substantial optical transparency, when provided over germanium, provides limited protection to germanium optical elements from impact damage caused by rain erosion. Hard carbon coatings on germanium are described in an article entitled "Liquid Impact Erosion Mechanisms and Transparent Materials" by J. E. Fields et al, Final Reports Sept. 30, 1982 to Mar. 31, 1983, Contract No. AFOSR-78-3705-D, Report No. AFW-AL-TR-83-4101. The hard carbon materials have not successfully adhered directly to other IR materials such as zinc sulfide and zinc selenide. Furthermore, hard carbon coatings, even on germanium as mentioned in the article, are susceptible to debonding during high velocity water droplet impact. It was theorized in that article that the sheering force resulting from radial outflow during water droplet impact causes the debonding of the hard carbon coating from the germanium layer. This phenomenon of debonding is believed to significantly increase as the thickness of the hard carbon layer is increased. Therefore, while thicker hard carbon coating layers should result in further impact protection for the optical element, in fact these thicker layers are more susceptible because of the aforementioned debonding problem. A further problem with hard carbon is that the index of refraction of hard carbon is about 2.45, substantially higher than index of refraction of many of the aforementioned optical materials such as zinc sulfide and zinc selenide. Accordingly, if an optical element is coated with a hard carbon coating, reflection losses at the incident surface of the optical element would be higher than if the optical element was not coated.

It is desirable, therefore, to provide an optical element having a high degree of durability and resistance to environmental exposures particularly high velocity water droplet impact and having enhanced optical properties within the wavelength band of 8 micrometers to 12 micrometers, particularly at certain regions within said wavelength band.

It is particularly desirable to provide an impact protection, antireflection layer to protect particularly brittle materials such as zinc sulfide and zinc selenide at least over the 8 μm to 12 μm band.

SUMMARY OF THE INVENTION

In accordance with the present invention, an infrared optical element which is transparent to infrared optical energy at least in the band of 8-12 μm, and which is resistant to high velocity water droplet impact includes a base layer of a first material having a first predetermined modulus of elasticity, a predetermined optical transmissivity over the range of optical wavelengths, and a first predetermined index of refraction ($n_s$). A composite coating layer is disposed over the base layer and comprises a first layer of a second material having a second substantially higher modulus of elasticity than the modulus of elasticity of the first material, and a second predetermined index of refraction ($n_o$). The first layer of the coating is deposited to an optical thickness ($t_o$) substantially given by: $t_o = (2N+1)\lambda/2$, where $\lambda$ is a selected wavelength in the wavelength range, and N is given by 0, 1, 2, 3, ... The composite layer includes a second layer of a third material having a high modulus of elasticity and an index of refraction between the index of refraction of the material the first layer, and the index of refraction of air. With this particular arrangement, the first layer comprised of a high modulus of elasticity material provides a thickness related to odd multiples of a half wavelength. The wavelength is selected to be a wavelength at which optical energy must be maximally transmitted through the optical element. At this designed for wavelength, therefore, the index of refraction of the first layer may be significantly different than the index of refraction of the base without any significant impact on the optical properties of the optical element at least at the designed for wavelength. The selection of the odd multiple of a half wavelength in optical thicknesses also relaxes the requirements for index matching at wavelengths near but not equal to the design for wavelength. Accordingly, a relatively thick first layer of a second material having a substantial high modulus of elasticity is provided providing concomitant protection to the optical element. By providing the second layer of a third material having a high modulus of elasticity and an index of refraction intermediate that of the first layer and air, impact protection, and suitable antireflection correction will be provided to the optical element when the second layer has an optical thickness equal to $t_o = (2N+1)\lambda/4$ at the wavelength which must be maximally transmitted.

In accordance with a further aspect of the present invention, the base layer of the element is selected from the group of materials consisting of zinc sulfide and zinc selenide. The composite coating layer is disposed over the base layer and comprises a first layer of a second material selected from the group consisting of cerium oxide, titanium oxide, zirconium oxide, and mixtures thereof, and a second layer of a third material selected from the group consisting of yttrium oxide, scandium oxide, mixtures thereof and mixtures thereof including magnesium oxide. The first layer of the composite coating is deposited to an optical thickness substantially related to an odd multiple of a half wavelength, at a wavelength of optical energy which must be maximally transmitted. The second layer of the composite coating has a high modulus of elasticity and optical thickness related to a quarter wavelength ($\lambda/4$) and an index of refraction between the index of refraction of the materials of the base layer and the first layer, and the index of refraction of air. With this particular arrangement, optical elements fabricated from the particularity brittle LWIR materials as zinc sulfide and zinc selenide are protected from droplet impact and have an anti-reflection coating which also provides significant resistance to droplet impact.

In accordance with a still further aspect of the present invention, an adhesion layer is disposed between the base and the first coating layer. The adhesion layer is an effectively optically thin layer of yttrium oxide having an optical thickness of about 10 Å to 1000 Å. The material of the first coating layer is selected from the group consisting of hard carbon or diamond, cerium oxide, titanium oxide, zirconium oxide, and mixtures thereof. The first coating layer is provided with an optical thickness equal to an odd multiple of a half wavelength at a wavelength which must be maximally transmitted. The second coating layer is then disposed over the first coating layer to anti-reflection correct the coating. With this arrangement, the thin adherence layer of yttrium oxide may be used to attach very high modulus materials such as hard carbon layer to base materials such as zinc sulfide, zinc selenide, germanium, mercury cadmium telluride, cadmium telluride, and silicon, as well as ternary sulfides such as calcium lanthanum sulfide.

BRIEF DESCRIPTION OF THE DRAWINGS

The foregoing features of this invention, as well as the invention itself, may be fully understood from the following detailed description of the drawings, in which.

DESCRIPTION OF THE PREFERRED EMBODIMENTS

A thick optical antireflection coating which protects the infrared optical element from environmental exposures and which provides suitable antireflection matching for the optical element over a passband of interest will now be described.

Figure 1:
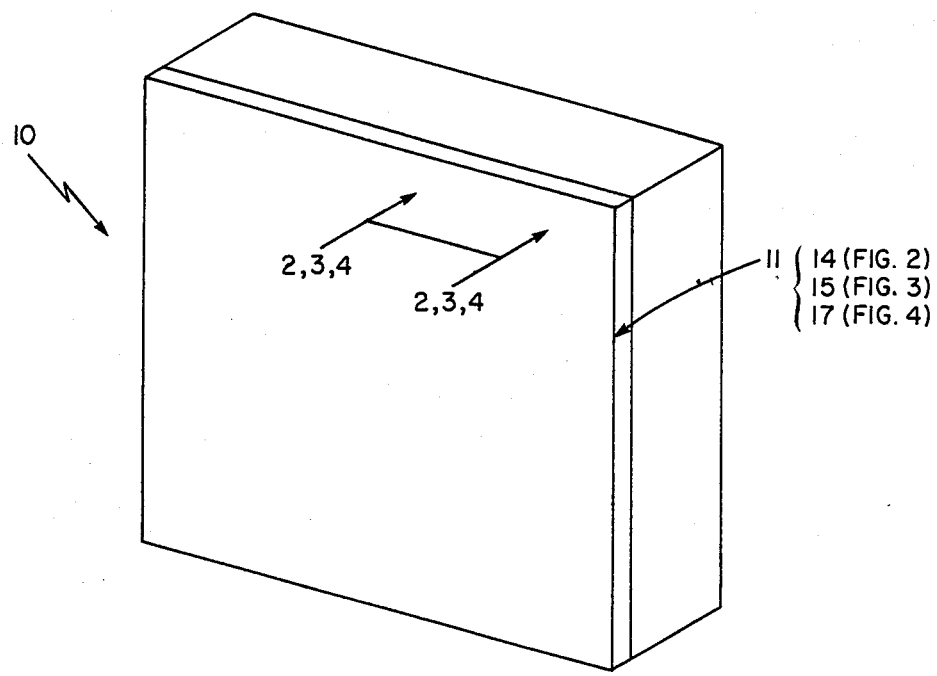
FIG. 1 is an isometric view of an optical element here a plate comprising a base layer and a composite protective layer in accordance with the present invention.

Referring now to FIG. 1, an optical element here a plate 10 is shown to include a base layer 12 comprising a material having predetermined optical properties. Although the optical element is herein described in particular as being a plate, it is understood that other types of optical elements such as windows, domes, lenses, etc. having shapes other than planar may alternatively be substituted for the aforementioned plate 10. Typically, the base 12 of the plate 10 will have a thickness of at least 0.05 inches, and generally 0.1 inches to about 0.5 inches or thicker. The base 12 of plate 10 further may have selected optical properties. For example, the base 12 may be comprised of a material which is transparent to optical energy generally in the infrared, visible, and/or ultraviolet spectrums. The material may be a dielectric or a semiconductor material. In particular, for optical elements used in infrared imaging systems in the 8 micrometers to 12 micrometers wavelength range, preferred materials include silicon, germanium, gallium arsenide, gallium phosphide, mercury cadmium telluride, cadmium telluride, zinc sulfide, zinc selenide, or one of the ternary sulfides such as calcium lanthanum sulfide. The selected material comprising layer 12 may be fabricated by any known technique such as powder compaction and densification or chemical vapor deposition. In particular, for infrared applications, the material selected for layer 12 is generally characterized as having a relatively low modulus of elasticity typically in the range of $5 \times 10^6$ psi to $20 \times 10^6$ psi, a high transmittance to infrared energy typically in the range of at least 50-75% over at least a portion of the infrared wavelength band of 2 micrometers to 30 micrometers and an index of refraction at 10 microns generally in the range of 2.2 to 4. The relevant mechanical and optical properties to some of these materials are shown in Table I.

TABLE I

Properties of Materials for Base Layer 12

| Material | n @ 10 μm | Thermal Expansion Coefficient ($10^{-6}$/°C.) | Elasticity Modulus of $X(10^6$ psi) |
|---|---|---|---|
| CdTe | 2.6 | 5.9 | 5.0 |
| ZnSe | 2.4 | 7.7 | 9.7 |
| ZnS | 2.2 | 7.4 | 10.8 |
| CaLa$_2$S$_4$ | 2.4 | 14.7 | 13.8 |
| GaP | 3.0 | 5.3 | 20.6 |
| GaAs | 3.3 | 5.7 | 15.5 |
| Ge | 4.0 | 6.1 | 15.0 |

Here disposed over base 12 is an impact resistant, composite antireflection coating layer 11. Suffice it here to say that composite coating layer 11 may have any one of the structures now to be discussed.

Figure 2:
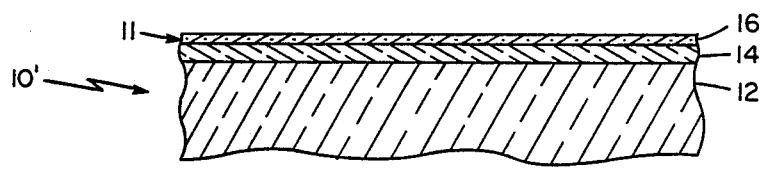
FIG. 2 is an exploded cross-sectional view taken along line 2—2 of FIG. 1 showing the composite protective layer in accordance with a first aspect of the present invention.

Referring now also to FIG. 2, coating layer 11 is shown to include a first protective layer 14 disposed over and preferably on the material comprising base 12. Protective layer 14 is comprised of a material having a modulus of elasticity that is substantially higher than the modulus of elasticity of the material of the base 12, and a high degree of transparency at the deposit thicknesses of the layer 14 over the selected wavelength band of the optical element. Layer 14 has a physical thickness corresponding to one-half of an optical wavelength at a particular wavelength of interest within the optical passband for the plate 10. In general, the optical thickness ($t_o$) of such a layer is defined as the product of the physical thickness ($t_p$) of the coating 14 and refractive index ($n_c$) of the material of the coating 14 ($t_o = t \cdot n_c$). The plate 10 is provided with layer 14 having an optical thickness $t_o = \lambda/2$, which corresponds to a physical thickness of $t_p = \lambda/2n_c$, where $\lambda$ is the wavelength of particular interest for the plate 10 and $n_c$ is the refractive index of the coating at the wavelength of interest.

Furthermore, the material deposited has a high degree of adherence to the material of layer 12 and in particular is highly resistant to debonding caused by sheer stresses induced by radial outflow during high velocity droplet impact such as water droplet impact. Layer 14 may be deposited by any technique such as ion beam sputtering, diode sputtering or evaporation. Furthermore, layer 14 may alternatively be provided over the plate 12 by dipping plate 12 in a solution comprising an organic vehicle and the high modulus of elasticity material. The plate after being dipped in solution of such material is removed from the solution and placed in the oven where the organic vehicle is driven off. Alternatively, the coating may be deposited by spray drying a mixture of a vehicle and the coating material over the base layer heated to a predetermined temperature. With such particular coating arrangements relatively inexpensive techniques are provided to form a uniform layer coating 14 on base 12.

For the aforementioned base layer material, suitable coating materials include hard carbon films or diamond films, cerium oxide, titanium oxide, zirconium oxide, and mixtures thereof such as cerium oxide-titanium oxide, cerium oxide-zirconium oxide, and titanium oxide-zirconium oxide. The relevant properties of materials for layer 14 are set forth in Table II.

TABLE II

Properties of Materials for Base Layer 14

| Material | n @ (10 μm) | Thermal Expansion Coefficient $10^{-6}$/°C. | Modulus of Elasticity $10^6$ psi | H$_2$O Solubility |
|---|---|---|---|---|
| Hard Carbon Diamond | 2.2-2.4 | — | 150 | insol. |
| CeO | 2.34 | 11.3 | 22 | insol. |
| TiO$_2$ | 2.4 | 8.2 | 44 | insol. |
| ZrO$_2$ | 2.1 | 7.2 | 28 | insol. |

Disposed over layer 14 is an antireflection impact protection layer 16 comprised of a high modulus of elasticity material having an index of refraction intermediate the index of refraction of the material of layer 14 and the material through which the plate 10 is to be exposed. For the aforementioned half wavelength layer materials, suitable coating materials which will properly antireflection coat the optical element include yttrium oxide (Y$_2$O$_3$), magnesium oxide (MgO), and scandium oxide (Sc$_2$O$_3$), as well as, homogeneous mixtures of these aforementioned materials. It should be pointed out, however, that magnesium oxide which reacts with water may not be by itself appropriate for correction of environmental exposures relating to water droplet impact and humidity. The relevant mechanical in optical properties for these materials are shown in Table III.

TABLE III

Properties of Materials for Base Layer 16

| Material | n @ (10 μm) | Transmissivity range of 1.5 μm thick | Thermal Expansion Coefficient $10^{-6}$/°C. | ($10^6$ psi) Modulus of Elasticity | H$_2$O Solubility |
|---|---|---|---|---|---|
| Y$_2$O$_3$ | 1.63 | 0.3-12 | 7.2 | 25 | insol. |
| Sc$_2$O$_3$ | 1.70 | 0.3-12 | 8.5 | 26 | insol. |
| MgO | 1.70 | 0.3-12 | 12.0 | 48 | insol. reacts |

TABLE III-continued

| Material | n @ (10 μm) | Transmissivity range of 1.5 μm thick | Thermal Expansion Coefficient $10^{-6}/°C$ | $(10^6 \text{ psi})$ Modulus of Elasticity | $H_2O$ Solubility with $H_2O$ |
|---|---|---|---|---|---|

With the arrangement described, since the thickness of layer 14 is a half wavelength at the wavelength of the radiation that must be maximally transmitted, the index of refraction of the layer may differ from the index of refraction of the substrate without any effect on the optical properties of the optical element at the "designed for" wavelength. The half wavelength coating of materials having the high modulus of elasticity such as hard carbon, diamond, cerium oxide, titanium oxide, and zirconium oxide will further provide increased impact resistant protection to the material of the base of the optical elements. Moreover, the selection of materials such as yttrium oxide, magnesium oxide, and scandium oxide for the material of antireflection coating layer 16 provides a antireflection coating layer also having a high modulus of elasticity which will provide impact protection to the optical element while also providing the appropriate index of refraction at the designed for wavelength to antireflection correct the optical element. The thickness of layer 16 is chosen to be a quarter wavelength at the wavelength that must be maximally transmitted.

Figure 3:
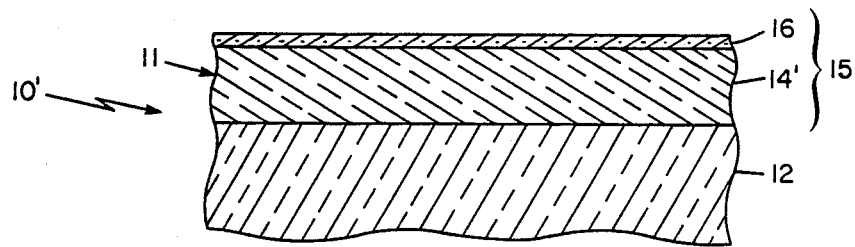
FIG. 3 is an exploded cross-sectional view taken along line 3—3 of FIG. 1 showing the composite protective layer in accordance with a further aspect of the present invention.

Referring now to FIG. 3 an alternate embodiment of the invention is shown to include the base layer 12 as described above, the antireflection coating layer 16 as described above, and a preferred, thick protective layer 14' generally as described above, except that the protective layer 14' has an optical thickness ($t_o$) given by:

$$t_o = (2n + 1)\lambda/2 \text{ where } n = 0, 1, 2, 3 \ldots i$$

and the physical thickness is related to $$t_p = t_o/n_c = \frac{(2n + 1)\lambda/2}{n_c}$$

where $n_c$ is the refractive index at $\lambda$. Accordingly, since multiples of half wavelength thick layers are chosen, a mismatch in the index of refraction between the index of the material of the base layer 12 of the optical element 10 and the index of refraction of the protective coating layer 14 has no effect on the optical properties of the element at the wavelength ($\lambda$) that must be maximally transmitted. Accordingly, layer 14' may be provided having an arbitrarily large thickness of odd multiples of a half wavelength, as described above.

Figure 4:
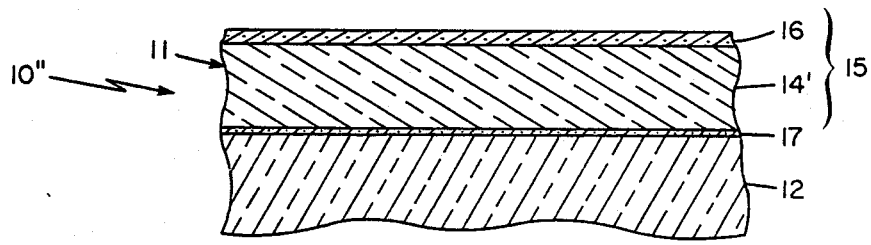
FIG. 4 is an exploded cross-sectional view taken along line 4—4 of FIG. 1 showing the composite protective layer in accordance with a still further aspect of the present invention.

Referring now to FIG. 4, a further embodiment of the invention is shown to include an adherent layer 17 disposed between the antireflection protective coating layer 15 described in conjunction with FIG. 3 and the base 12. As described in copending patent application No. 875,893 filed June 18, 1986 by Tustison et al and assigned to the Assignee of the present invention for materials such as hard carbon disposed over materials such as zinc sulfide and zinc selenide, it is preferred to interpose an adherent layer of yttrium oxide ($Y_2O_3$) to bond the hard carbon layer to the ZnS and ZnSe substrate materials. Adherent layer of yttrium oxide here has a thickness, however, which is substantially less than a quarter of a wavelength, and preferably has thickness in the order of 10 A to 100 A, up to about 1000 A, and merely provides a bonding layer for the hard carbon, and also diamond when used as coating layer 14'. It should be appreciated at this point, therefore, that the thickness of layer 17 does not significantly affect the optical properties of the base 12 but merely serves to physically hold the hard carbon or diamond layer 14' to the base 12 of the plate 10. It further should be pointed out that other materials such as the titanium oxides, zirconium oxide, and cerium oxide may be deposited directly over the substrate 12 without the layer 17. However, it may also be preferable to include layer 17 with certain ones of the materials comprising the base layer 12.

Figure 5:
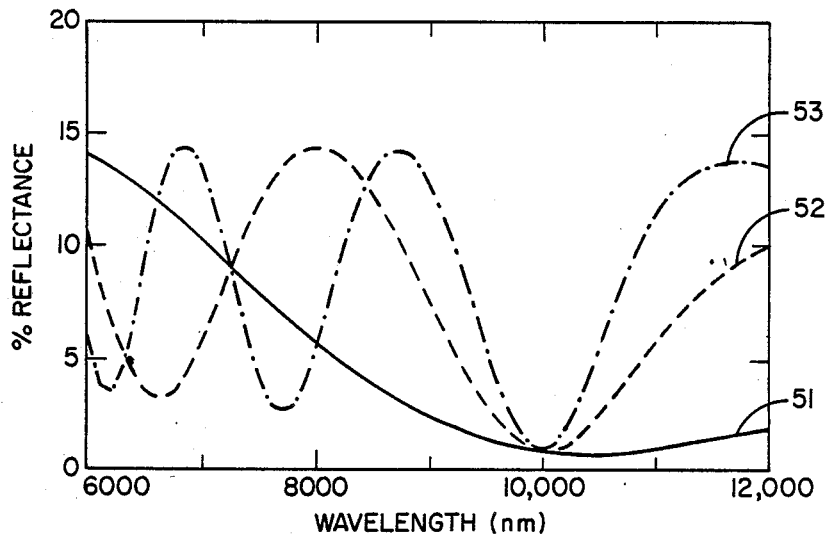
FIG. 5 is a plot of percent reflectance versus wavelength for odd multiple single layer coatings of protective layers.
Figure 6:
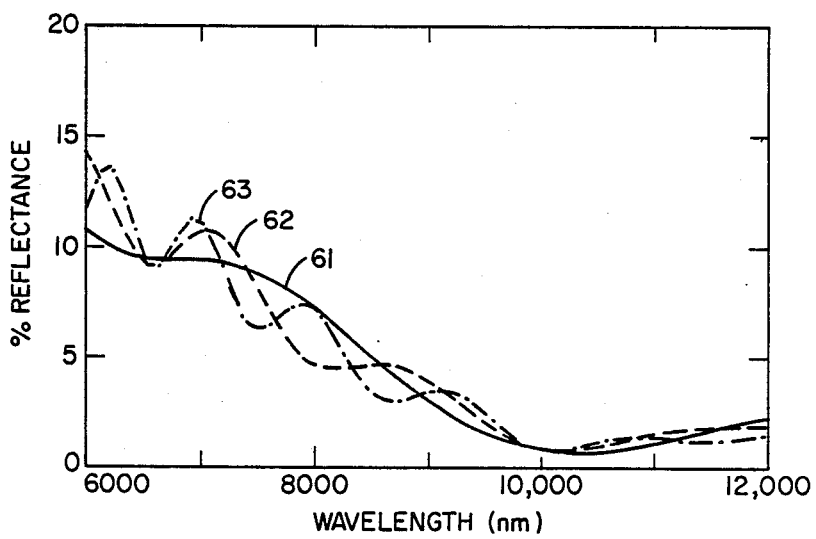
FIG. 6 is a plot of percent reflectance versus wavelength for composite protective coatings in accordance with the present invention.
Figure 7:
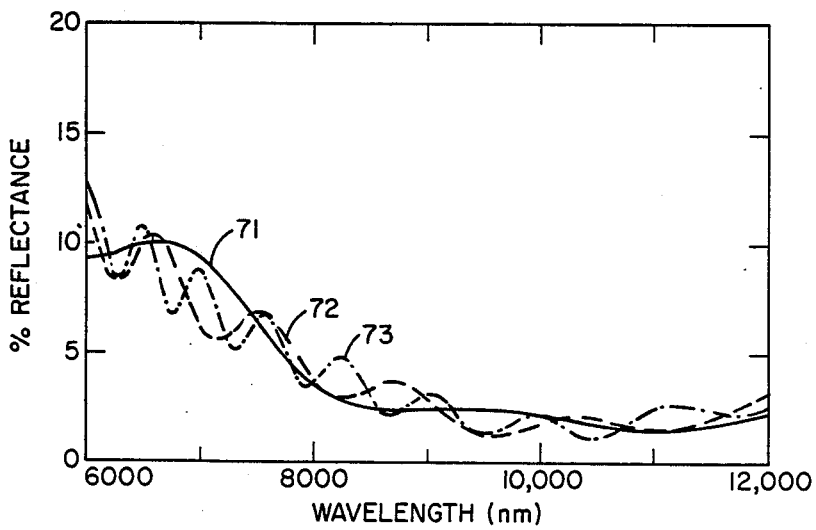
FIG. 7 is a plot of percent reflectance versus wavelength for an optimized composite protective layer in accordance with the present invention.

Referring now to FIGS. 5-7, plots of percent reflectance versus wavelength are shown.

FIG. 5 shows a theoretical plot when using quarter wavelength coatings of an optical material having an index of refraction which is less than the index of refraction of the material of the base layer. For example, as described in the above copending application, yttrium oxide having odd multiples of quarter wavelengths may be provided over the base 12. At single quarter wavelength thick coatings of yttrium oxide (curve 51) at the design for wavelength of 10 microns, the percent reflectance is substantially minimal and over a relatively broad range of wavelengths such as 8-12 microns, the percent reflectance is less than about 5 percent. However, with thicker, odd multiple quarter wavelength coatings (curve 52, $3\lambda/4$ and curve 53, $5\lambda/4$) of yttrium oxide, although the amount of protection for the material increases, it is also observed that the percent reflectance also increases and deviates substantially from the % reflectance of the ($\lambda/4$) thick coating over 8-12 μm. This is generally undesireable in many applications.

FIG. 6 shows theoretical percent reflection over 6 μm to 12 μm band for three different composite coatings. Curve 61 shows percent reflection for a $\lambda/2$ thick cerium oxide ($CeO_2$) layer as layer 14 and a $\lambda/4$ thick layer of yttrium oxide ($Y_2O_3$) as layer 16. For curve 62, layer 14 has a thickness of 3 $\lambda/2$, and layer 16 of $Y_2O_3$ has a thickness of $\lambda/4$, and for curve 63 layer 14 has a thickness of $5\lambda/2$, and layer 16 of $Y_2O_3$ has a thickness of $\lambda/4$. The percent reflectance is about 7.5 percent over an optical wavelength band of about 8 microns to 12 microns, even for very thick layers of cerium oxide. It is to be noted that a ripple in the percent reflectance characterized is provided with successively thicker odd multiple half wavelength coatings of $CeO_2$, for layer 14, in combination with a single $\lambda/4$ coating. This ripple about an average value (not depicted) has a predetermined amplitude and frequency. The amplitude of the ripple is related to the degree of mismatch between the index of refraction of the optical element and the index of refraction of the protective coating layer 14. The frequency of the ripple (i.e. the spacing between the peaks of the ripple) is related to the thickness of the layer with higher thickness layers having a higher frequency or more closely spaced ripple peaks. For a material having an index of refraction matched to the index of refraction of the material the substrate over the optical wavelength range of interest, the ripple would vanish and it would thus be equivalent to the half wavelength cerium oxide layer thickness, as shown. Moreover, if the dispersion of the indices of reflection for the materials of the base 12 and protective layer 14' are matched as a function of wavelength over a wavelength band, then over that wavelength band, percent reflectance would be substantially the same as it is at 10 microns.

Using optical design techniques, the thicknesses of the antireflection coating layer 16 and the protection layer 14 or 14' may be slightly adjusted from the nominal quarter wavelength and half wavelength thickness to provide a maximal passband between the 8 and 12 micron range, for example, with only a slight increase in the percent reflection over that range, as shown for example in FIG. 7. In FIG. 7 accordingly the two-layer composite structure has the thicknesses as set forth in Table V.

TABLE V

| Curve | Thickness Layer 14 ($\mu$m) | Thickness Layer 16 ($\mu$m) | % R @ 10$\mu$ | Bandwidth % R 3.5% |
|---|---|---|---|---|
| 71 | 3.690 | 1.399 | 2.5 | 8 $\mu$m to >12 $\mu$m |
| 72 | 11.4 | 1.380 | 2.2 | 8 $\mu$m to >12 $\mu$m |
| 73 | 20.430 | 1.380 | 2.5 | 8.3 $\mu$m to >12 $\mu$m |

Having described preferred embodiments in the invention, it will now become apparent to one of the skill in the art that other embodiments incorporating their concepts may be used. It is felt, therefore, that these embodiments should not be limited to disclosed embodiments, but rather should be limited only to by the spirit and scope of the appended claims.

What is claimed is:

1. An optical element comprising:
   a base comprising a first material having a first predetermined optical transmissivity over a predetermined range of optical wavelengths, and a first predetermined modulus of elasticity;
   a composite layer disposed on said base layer to protect said base layer from liquid impact erosion comprising:
   a first layer of a second, different material having a second substantially higher modulus of elasticity than the modulus of elasticity of the first material, said layer having an optical thickness of about $(2N+1)\lambda/2$, where $\lambda$ is a wavelength within the predetermined range of optical wavelengths of the first material of the base and N is an integer; and
   a second layer of a third, different material having a third modulus of elasticity which is substantially higher than the modulus of elasticity of the first material, a index of refraction at the wavelength selected to antireflection correct the optical element, and an optical thickness of about $(\lambda/4)$.

2. The optical element as recited in claim 1 wherein the first material of the base is selected from the group consisting of zinc sulfide, zinc selenide, gallium arsenide, gallium phosphide, mercury cadmium telluride, and cadmium telluride and a ternary sulfide having the general chemical formula $MN_2S_4$, where M is a cation selected from the Group 1A elements, N is a cation selected from lanthanide where erred seried elements, and S is a sulfide cation S2-.

3. The optical element as recited in claim 2 wherein the second material of the first layer is selected from the group consisting of hard carbon, diamond, and cerium oxide, titanium oxide, zirconium oxide, and mixtures thereof.

4. The optical element as recited in claim 3 wherein the third material of the second layer is selected from the group consisting of yttrium oxide, scandium oxide, magnesium oxide, and mixtures of yttrium oxide, scandium oxide, and magnesium oxide.

5. An optical element having an impact resistant antireflection coating layer disposed over at least a surface thereof which is resistant to high velocity water droplet impact comprises:
   a base layer of a material selected from the group consisting of zinc sulfide and zinc selenide, said base having a predetermined optical transmissivity over the optical wavelength range of at least 8 microns to 12 microns; and
   a composite layer disposed over said base layer which provides the impact resistant antireflection coating for the optical element comprising:
   a first layer comprising a material selected from the group consisting of hard carbon, cerium oxide, titanium oxide, zirconium oxide, and mixtures thereof having an optical thickness of about $(2N+1)\lambda/2$, where $\lambda$ is a wavelength within the predetermined wavelength range of the base, and N is an integer; and
   a second layer comprising a material selected from the group consisting of yttrium oxide, scandium oxide, and mixtures thereof, including magnesium oxide having an optical thickness of about $(\lambda/4)$.

6. The optical element as recited in claim 5 wherein the first layer of the composite layer is cerium oxide and the second layer of the composite layer is yttrium oxide.

7. The optical element as recited in claim 5 wherein the second material comprising the first layer of the composite layer is selected from the group consisting of hard carbon, cerium oxide, titanium oxide, zirconium oxide, and mixtures thereof.

8. The optical element as recited in claim 7 wherein the material of the second layer is selected from the group consisting of yttrium oxide, scandium oxide, magnesium oxide, and mixtures thereof.

9. An optical element having an impact resistant antireflection coating layer disposed over at least a surface thereof which is resistant to high velocity water droplet impact comprises:
   a base layer of a material selected from the group consisting of zinc sulfide and zinc selenide, said base having a predetermined optical transmissivity over the optical wavelength range of at least 8 microns to 12 microns; and
   an adhesion layer disposed on the base layer having an optical thickness of about 10 Å to 1000 Å;
   a composite layer disposed over said adhesion layer which provides the impact resistant antireflection coating for the optical element comprising:
   a first layer comprising a material selected from the group consisting of hard carbon, cerium oxide, titanium oxide, zirconium oxide, and mixtures thereof having an optical thickness of about $(2N+1)\lambda/2$, where $\lambda$ is a wavelength within the predetermined wavelength range of the base, and N is an integer; and
   a second layer comprising a material selected from the group consisting of yttrium oxide, scandium oxide, and mixtures thereof with magnesium oxide said second having an optical thickness of about $(\lambda/4)$.

10. The optical element as recited in claim 9 wherein the adhesion layer is yttrium oxide and the first layer is a hard carbon layer, and the second layer is yttrium oxide.

11. The optical element as recited in claim 9 wherein the material of the composite layer is selected from the group consisting of hard carbon, cerium oxide, zirconium oxide, and titanium oxide and mixtures thereof.

12. The optical element as recited in claim 11 wherein the third material is selected from the group consisting of yttrium oxide, scandium oxide, magnesium oxide, and mixtures thereof.

13. A method of protecting an optical element from damage caused by water droplet impact comprises the steps of:
providing the optical element having a base comprised of a first material having a first predetermined optical transmissivity over a predetermined range of optical wavelengths
providing a first layer of a second material having a second substantially higher modulus of elasticity than the modulus of elasticity of the first material, said layer having an optical thickness of about $(2N+1)\lambda/2$, where $\lambda$ is a wavelength within the predetermined range of optical wavelengths of the first material of the base, and N is an integer, and
providing a second layer comprising a third material having a third substantially higher modulus of elasticity than the modulus of elasticity of the first material, an index of refraction selected to antireflection correct the optical element, and an optical thickness of about $(\lambda/4)$.

14. The method as recited in claim 13 wherein the first material of the composite layer is selected from the group of materials consisting of hard carbon, diamond, cerium oxide, titanium oxide, zirconium oxide, and mixtures thereof.

15. The method as recited in claim 13 wherein the third material of the second layer is selected from the group consisting of yttrium oxide, scandium oxide, magnesium oxide, and mixtures thereof.

16. The method as recited in claim 13 wherein the second material of the first layer is selected from the group consisting hard carbon and cerium oxide, and the third material of the second layer is selected from the group consisting of yttrium oxide and scandium oxide, and wherein the base material is selected from the group of materials consisting of zinc sulfide, zinc selenide, germanium, gallium arsenide, gallium phosphide, mercury cadmium telluride, and cadmium telluride, and a ternary sulfide having the general chemical formula $$Mn_2S_4$$

where M is a cation selected from the group 1A elements, n is a cation selected from the lanthanide rare earth series elements, and S is a sulfide cation $S_2$..

* * * * *